United States Patent [19]

Jung et al.

[11] Patent Number: 5,444,027
[45] Date of Patent: Aug. 22, 1995

[54] COMPOSITIONS OF HIGH FREQUENCY DIELECTRIC CERAMICS

[75] Inventors: Hyung J. Jung; Ki H. Yoon; Dong P. Kim; Eung S. Kim, all of Seoul, Rep. of Korea

[73] Assignee: Korea Institute of Science and Technology, Seoul, Rep. of Korea

[21] Appl. No.: 241,587

[22] Filed: May 12, 1994

[51] Int. Cl.$^6$ .............................................. C04B 35/00
[52] U.S. Cl. ..................................................... 501/135
[58] Field of Search ......................................... 501/135

[56] References Cited

U.S. PATENT DOCUMENTS

| | | | |
|---|---|---|---|
| 4,487,842 | 12/1984 | Nomura et al. | 501/135 |
| 5,246,898 | 9/1993 | Fujimaru et al. | 501/135 |
| 5,268,341 | 12/1993 | Koyasu et al. | 501/135 |

FOREIGN PATENT DOCUMENTS

| | | | |
|---|---|---|---|
| 4-17207 | 1/1992 | Japan | 501/135 |

OTHER PUBLICATIONS

Ferroelectrics, vol. 133, (1992,) pp. 187–192, Eung Soo Kim, et al., "Microwave Dielectric Properties of Complex Perovskite Ba(Mg1/3Ta2/3)O3" no month avail.
Journal of the American Ceramic Society, vol. 69, No. 4, (1986,) pp. C-82-C-83, K. Kakegawa, et al., "Preparation of Ba(Mg1/3Ta2/3)O3 by using oxine" no month avail.
Jpn. Journ. Appl. Phys., vol. 31, (1992,) pp. 3132–3135, Toru Nagai, et al., "Contribution of Dielectric Constant To Change In Temperature Coefficient of Resonant Frequency In (Ba1–xSrx) (Mg1/3Ta2/3)O3 Compounds" no month avail.
Journal of the American Ceramic Society, vol. 75, No. 12, (1992,) pp. 3337–3340, Olivier Renoult, et al., "Sol–Gel Processing and Microwave Characteristics of Ba(Mg1/3Ta2/3)O3 Dielectrics" no month avail.

*Primary Examiner*—David Brunsman
*Attorney, Agent, or Firm*—Oblon, Spivak, McClelland, Maier, & Neustadt

[57] ABSTRACT

A composition of high frequency dielectric ceramics having a high unloaded Q value (Qu) and a high dielectric constant in a high frequency range such as micro- and millimeter wavelengths is disclosed. The composition according to the present invention is composed of the materials, $(1-x)[Ba(Mg_{\frac{1}{3}}Ta_{\frac{2}{3}})O_3] + x\text{-}BaWO_4 + 0.1xMnO_2$ ($0.01 \leq x \leq 0.09$).

1 Claim, No Drawings

COMPOSITIONS OF HIGH FREQUENCY DIELECTRIC CERAMICS

BACKGROUND OF THE INVENTION

1. Field of the Invention

The present invention relates to new compositions of new high frequency dielectric ceramics. More particularly, the present invention relates to compositions of high frequency dielectric ceramics having a high unloaded Q value (Qu) and low temperature sintering characteristics in a high frequency range such as micro- and millimeter wavelengths, as compared with the conventional compositions of ceramics.

2. Description of the Prior Art

Generally, compositions of dielectric ceramics are used as construction materials for dielectric resonators for stabilizing the frequency of band-pass filters, solid state oscillators, substrates, waveguides, antennas, and so on, in a high frequency range such as micro- and millimeter wavelengths. In recent years, rapid developments in integration technology of microwave circuits has led to an increasing need to develop dielectric ceramics for use in a high frequency range with high dielectric constants, low dielectric losses, and temperature stability at a resonant frequency with low production costs.

A wide variety of ceramic systems have been suggested as the high frequency dielectric ceramics. A representative example of such systems includes a $BaO\text{-}TiO_2$ system, a $ZrO_2\text{-}SnO_2\text{-}TiO_2$ system, a Perovskite system, and the like. However, most of the known systems show high dielectric losses when they are used in a high frequency range of above 10 GHz.

It has been reported that a complex Perovskite system having the formula of $Ba(Mg_{\frac{1}{3}}Ta_{\frac{2}{3}})O_3$ shows good dielectric characteristics in a high frequency range. However, in order to obtain dielectric ceramics having a dielectric constant (K) of 23, an unloaded Q value (Qu) of 8,000, a temperature coefficient of resonant frequency (TCF) of 8 ppm/°C. at 10.5 GHz, and a high sintering temperature of above 1,650° C. should be achieved. Moreover, conventional systems cannot produce dielectric ceramics having a Qu more than 8,000 and a TCF less than 8 ppm/°C. in a high frequency.

SUMMARY OF THE INVENTION

It is therefore an object of the invention to provide a composition of dielectric ceramics having a high unloaded Q value and dielectric constant, as well as a low temperature coefficient of resonance frequency.

It is another object of the invention to provide a composition of dielectric ceramics which can be sintered at a relatively low temperature.

It is still another object of the invention to provide a composition of dielectric ceramics which shows a low dielectric loss and its dielectric constant with a low dependency on temperature in a low frequency range and thus is applicable to various industrial fields.

Other objects and advantages of the invention will become apparent through the remainder of the specification.

DETAILED DESCRIPTION OF THE INVENTION

We, the inventors of the present invention, have conducted an intensive investigation to develop a composition of dielectric ceramics useful in a high frequency range. As a result, it has been unexpectedly discovered that a novel class of composition of ceramics shows a high unloaded Q value and a superior temperature stability at a resonant frequency, and have accomplished the present invention.

In accordance with the aspect of the invention, a new composition of dielectric ceramics is provided consisting of the materials, $(1-x)[Ba(Mg_{\frac{1}{3}}Ta_{\frac{2}{3}})O_3]+x\text{-}BaWO_4+0.1xMnO_2 (0.01 \leq x \leq 0.09)$.

The composition of dielectric ceramics according to the present invention is featured by having a high unloaded Q value of up to 15,000 and a high dielectric constant of up to 24.8 in a high frequency range. According to the invention, the temperature stability at a resonant frequency of the composition can be readily controlled in an economically efficient manner.

The composition of dielectric ceramics according to the invention can be prepared by mixing BaO, MgO, $Ta_2O_5$, $MnO_2$, and $BaWO_4$ in a proper proportional ratio and sintering the resulting mixture at a low temperature without lowering the dielectric constant, the unloaded Q value (Qu), and the temperature coefficient of resonant frequency (TCF) thereof, and thus have found commercial acceptability for large scale industrial processes.

Preferred starting materials for producing the composition of the invention are $BaCO_3$, MgO, $Ta_2O_5$, $MnO_2$, and $WO_3$. Ethanol is suitable for a solvent. The starting materials and the solvent may be treated by a method well known in the art. This process according to the present invention is summarized below.

First, the starting materials and the solvent are wet mixed for a predetermined time, preferably 24 hrs., in a zirconia ball mill, and then dried. To obtain $Ba(Mg_{\frac{1}{3}}Ta_{\frac{2}{3}})O_3$, $BaCO_3$, MgO and $Ta_2O_5$ are mixed in a predetermined amount in ethanol. This mixture is then calcined at 1200° C. for 10 hrs. in air. To obtain $BaWO_4$, $BaCO_3$ and $WO_3$ are mixed in a predetermined amount in ethanol. This mixture is calcined at 700° C. for approximately 5 hrs. Subsequently, the resulting two calcined materials and $MnO_2$ in powder form are mixed with each other in a desired ratio, wet-mixed and crushed in the above ball mill, and then dried. Then, the resultant mixture is molded and fabricated into a disc of 7 mm in diameter under a pressure of 550 kg/cm², and sintered at 1450° to 1650° C. for 2 hrs. in air to produce a composition of dielectric ceramics according to the present invention.

The dielectric constant and the unloaded Q value (Qu) of the specimens thus sintered are measured from both the high resonant frequency and the diameter of the specimen according to a post resonant method. By placing each specimen in a temperature-controlled box, and measuring changes in its resonant frequency at a temperature of 20° to 80° C., the temperature coefficient of the resonant frequency can be estimated.

DESCRIPTION OF THE PREFERRED EMBODIMENTS

The present invention will be illustrated in greater detail by way of the following examples. The examples are presented for illustration purpose only and should not be construed as limiting the invention which is properly delineated in the claims.

EXAMPLE 1

314.17 G of $BaCO_3$, 21.88 g of MgO and 234.50 g of $Ta_2O_5$ were weighed and ball-milled together for 24 hrs. with 1000 ml ethanol and zirconia balls to prepare $Ba(Mg_{\frac{1}{3}}Ta_{\frac{2}{3}})O_3$. The mixture was then dried and calcined at 1200° C. for 10 hrs. in air.

25.61 G of $BaCO_3$ and 30.10 g of $WO_3$ were weighed and ball-milled together for 24 hrs. with 100 ml ethanol and zirconia balls to prepare $BaWO_4$. The mixture was then dried and calcined at 700° C. for 5 hrs. in air. Thereafter, 500 g and 50 g of each calcined powder were obtained.

These calcined powders were then mixed with $MnO_2$ such that they meet the following formula $(1-x)[Ba(Mg_{\frac{1}{3}}Ta_{\frac{2}{3}})O_3]:xBaWO_4:0.1xMnO_2$ ($0.01 \leq x \leq 0.09$). The mixed powders were milled again with zirconia balls for 24 hrs. in ethanol and then dried. The mixture was screened by 80 mesh. The screened powders were pressed into a 7 mm diameter disc at 550 kg/cm², and then sintered at 1450° to 1650° C. for 2 hrs. in air. As a result, a $[Ba(Mg_{\frac{1}{3}}Ta_{\frac{2}{3}})O_3]$ solid solution containing $BaWO_4$ and $MnO_2$ was obtained.

The dielectric constant and the unloaded Q value (Qu) of each specimen thus sintered were measured from both the resonant frequency and the diameter of the specimen according to a post resonant method. Each specimen was placed in a temperature-controlled box, and changes in the resonant frequency thereof was measured at a temperature of 20° to 80° C. to estimate the temperature stability in the resonant frequency. The results are shown in the table below.

TABLE

| Sample | Composition (x) | Sintering Condition (Temp.-Hour) | K | Q(Qu) | TCF (ppm/°C.) |
|---|---|---|---|---|---|
| 1 | 0 | 1650° C. - 2h | 23 | 8000 | 8 |
| 2 | 0.01 | 1650° C. - 2h | 24.8 | 12000 | 6 |
| 3 | 0.02 | 1550° C. - 2h | 24.7 | 10900 | 5 |
| 4 | 0.01 | 1450° C. - 2h | 24.5 | 8900 | 6 |
| 5 | 0.03 | 1650° C. - 2b | 24.7 | 14200 | — |
| 6 | 0.03 | 1550° C. - 2h | 24.6 | 12800 | — |
| 7 | 0.03 | 1450° C. - 2h | 24.6 | 10800 | — |
| 8 | 0.05 | 1650° C. - 2h | 24.2 | 15500 | 3 |
| 9 | 0.05 | 1550° C. - 2h | 24.1 | 13800 | 2 |
| 10 | 0.05 | 1450° C. - 2h | 23.9 | 12000 | 2 |
| 11 | 0.07 | 1650° C. - 2h | 23.8 | 12600 | — |
| 12 | 0.07 | 1550° C. - 2h | 23.7 | 11100 | — |
| 13 | 0.07 | 1450° C. - 2h | 23.6 | 8900 | — |
| 14 | 0.09 | 1650° C. - 2h | 23.2 | 10000 | 0 |
| 15 | 0.09 | 1550° C. - 2h | 22.9 | 8800 | 0 |
| 16 | 0.09 | 1450° C. - 2h | 22.7 | 7000 | −1 |

*x: Composition proportional ratio in the following formula:
$(1-x)[Ba(Mg_{\frac{1}{3}}Ta_{\frac{2}{3}})O_3] + XBaWO_4 + 0.1 xMnO_2$ As apparent from the above table, the compositions of dielectric ceramics according to the invention have an unloaded Q value (Qu) of at most 15500 in a high frequency range that is about 2 times higher than that obtained from conventional compositions of ceramics. It may be possible to control the temperature stability in the resonant frequency by adjusting the amounts of x. It also is possible to produce the compositions by sintering at a low temperature. Thus, the compositions of the invention has found commercial acceptability for large scale industrial processes.

In addition, it is confirmed that the compositions of the invention can be widely used owing to its low dielectric loss and its dielectric constant having a low dependency on temperature even in a low frequency range.

What is claimed is:

1. A composition of high frequency dielectric ceramics of $(1-x)[Ba(Mg_{\frac{1}{3}}Ta_{\frac{2}{3}})O_3]+xBaWO_4+0.1xMnO_2$ ($0.01 \leq x \leq 0.09$).

* * * * *